June 2, 1964    M. V. JOHNSON, JR., ETAL    3,135,628
APPARATUS FOR COATING WITH ADHESIVE OR OTHER FLUENT MATERIALS
Filed May 11, 1961    5 Sheets-Sheet 1

INVENTORS,
MAURICE V. JOHNSON, JR.
WAYNE E. ZWIACHER
BY
Paul A. Weilein
ATTORNEY

INVENTORS.
MAURICE V. JOHNSON, JR.
WAYNE E. ZWIACHER

BY Paul A. Weilein
ATTORNEY

June 2, 1964     M. V. JOHNSON, JR., ET AL     3,135,628
APPARATUS FOR COATING WITH ADHESIVE OR OTHER FLUENT MATERIALS
Filed May 11, 1961     5 Sheets-Sheet 3

INVENTORS.
MAURICE V. JOHNSON, JR.
WAYNE E. ZWIACHER

BY Paul A. Weilein
ATTORNEY

FIG. 14.

INVENTORS.
MAURICE V. JOHNSON, JR.
WAYNE E. ZWIACHER
BY
Paul A. Weilein
ATTORNEY

United States Patent Office

3,135,628
Patented June 2, 1964

3,135,628
APPARATUS FOR COATING WITH ADHESIVE OR OTHER FLUENT MATERIALS
Maurice V. Johnson, Jr., Upland, and Wayne E. Zwiacher, Ontario, Calif., assignors to Sunkist Growers, Inc., Los Angeles, Calif., a corporation of California
Filed May 11, 1961, Ser. No. 109,328
28 Claims. (Cl. 118—3)

The present invention relates to an apparatus for coating with adhesive or other fluent materials, and more particularly to coating apparatus which is especially well suited to the application of adhesive to box flaps and the like in box sealing and closing machines, though it will be understood that features of the invention are not necessarily limited to such a specific application.

Heretofore in the application of adhesive to box flaps in box flap closing machines it has been the practice to apply to the inside face of the box flaps, as the box progresses through the machine, a broad film of fluent adhesive as by passing the flap in contact with a roller which revolves in a pot or reservoir of adhesive. Such practice results in the application of an extensive amount of adhesive to the flap, requiring long periods of time for the adhesive to dry to the extent necessary to securely hold the flap in place. Moreover, such roller and pot type applicators for adhesive are subject to costly operating problems such as cleaning of the machine at the close of a run of boxes, as well as substantial waste of the adhesive material.

Among the primary objectives of the present invention is the provision of a device for applying adhesive to the inside faces of box flaps in a manner whereby the adhesive is applied selectively over a discrete surface area so that the adhesive will dry rapidly.

Another object is to provide adhesive applying apparatus or other coating apparatus including a plurality of applicator heads, each having a revolvable member which constitutes a check valve operable by a box flap during the application of adhesive thereto and closable by the pressure of adhesive material immediately upon disengagement of the revolvable member from a box flap or other surface to which an adhesive or other fluent material is to be applied.

In addition, it is a further object to provide a fluent material applicator as referred to in the next preceding objective wherein the revolvable member in conjunction with the applicator head provides a gauge which determines the thickness of the film of fluent material or adhesive applied to the surface of a box flap or the like, when the revolvable valve element is open.

Among the practical advantages of the present invention is ease of care and maintenance of an adhesive applying box closing machine. In this connection, the applicator of the invention is not subject to the conventional cleaning problem at the end of each day, for example, but instead, may be employed day by day and cleaned within a short period of time at the end of a week's use, for example. Furthermore, the applicator of the present invention provides essentially a closed adhesive system so that the adhesive is not subjected to contamination or loss due to evaporation of solvents from the adhesive material.

The applicator device of the present invention, furthermore, enables the application of a fluent material to a surface to be coated regardless of the disposition of the surface, that is, the surface may be either horizontal, as is necessary in connection with roller and pot type applicators, or the surface to be coated may be disposed vertically or at any other desired disposition by virtue of the improved applicator hereof.

Another object of the invention is to provide an adhesive or other fluent material applying or coating apparatus wherein one or more carriers are shiftably disposed in the path of movement of a member to be coated, such carrier or carriers having an applicator provided with a ball check valve at its lower end engageable by the member to be coated to open the valve and allow the flow of adhesive or other fluent material from the applicator, the carrier being supported in such a manner that a plurality of applicators arranged in spaced relation along the path of travel of the member to be coated will remain in pressure engagement with the member to be coated regardless of variations in thickness of the member to be coated.

The foregoing objective is preferably accomplished by supporting the carrier on parallel linkage, and in addition, means are preferably provided for shifting the carrier relative to its support so as to dispose the carrier and its applicators in an inoperative position and to enable movement of the carrier and its applicators to an operative position.

Yet another object of the invention is to provide an adhesive applying apparatus wherein at least one applicator head is shiftably supported for movement from a first position out of the path of movement of a member to be coated, to a second position for coating such member and including means for automatically moving the applicator head between such first and second positions, responsive to a member to be coated being presented to a position whereat it is disposed for engagement by the applicator head and subsequently being presented to a position whereat the coating operation has been completed. In accomplishing this objective means are provided for shifting the applicator head between said first and second positions, and preferably such means comprises a fluid pressure actuated device and a control system therefor which is responsive to the position of a member to be coated as it moves into a position whereat it may be engaged by the applicator head and subsequently moves on beyond such position.

More specifically, the invention contemplates a fluid pressure operated control system for shifting the applicator head between the above mentioned first and second positions, such control system including an electrically operated control valve which is actuatable by a control circuit, the control circuit also providing means for actuating the control valve to shift the actuator head from said second position to said first position when the source of power employed to cause movement of the member to be coated relative to the applicator head is shut off.

Other novel features of the control system as well as other advantages and novel features of the coating apparatus will hereinafter be described or will become apparent to those skilled in the art, and the novel features thereof will be defined in the appended claims.

In the accompanying drawings.

Like reference characters in the several views of the drawings and the following description designate corresponding parts.

The machine herein illustrated for the purpose of disclosing the present invention is described in detail in Patent No. 2,095,258, dated October 12, 1937, to which reference may be made for a disclosure of apparatus for feeding cartons to a flap manipulating and glue applying section of the machine, such as that shown in the present application. In addition, reference may be made to that patent for a more specific description of the carton flap manipulating and the conventional adhesive applying instrumentalities.

Figure 1:
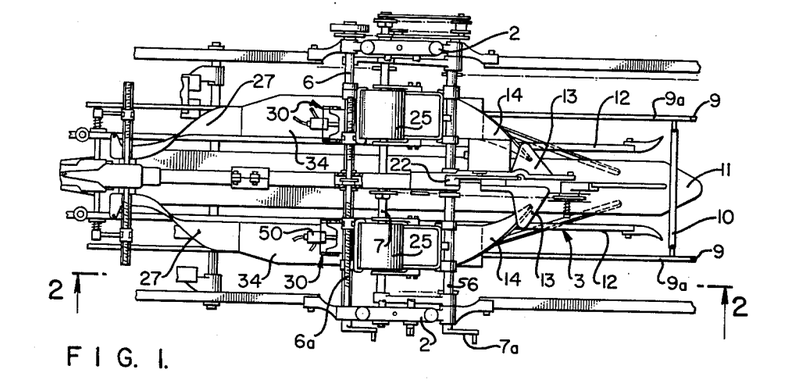
FIG. 1 is a fragmentary top plan view showing a conventional machine for applying adhesive to a box flap and closing the flap, with the adhesive applicator means of the invention applied thereto.
Figure 2:
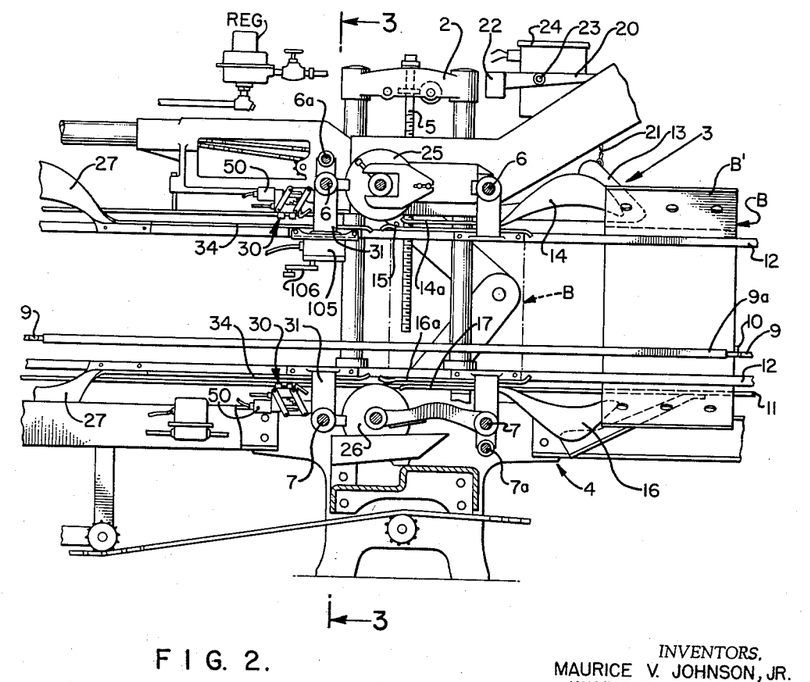
FIG. 2 is a fragmentary vertical sectional view as taken on the plane of the line 2—2 of FIG. 1, but on a slightly enlarged scale.
Figure 3:
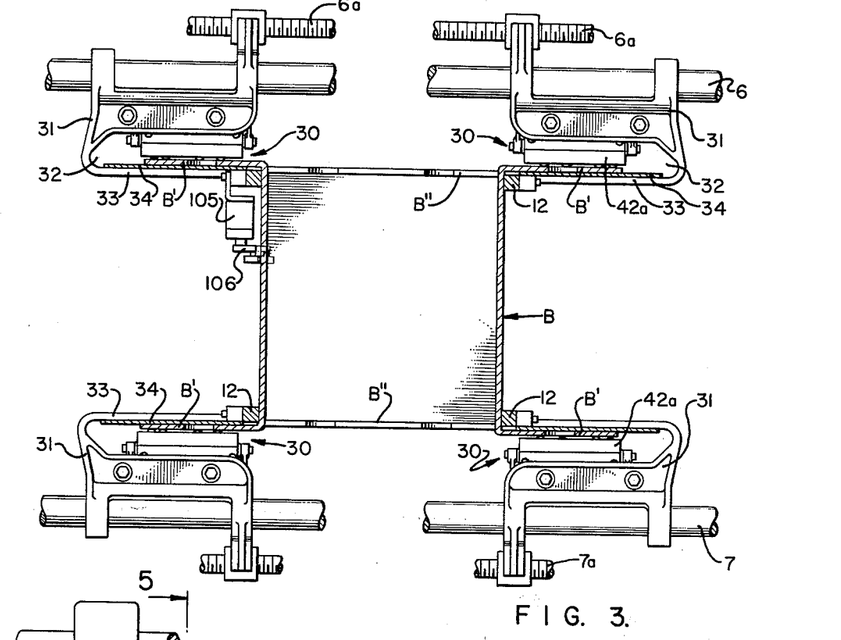
FIG. 3 is a transverse sectional view as taken on the line 3—3 of FIG. 2.
Figure 4:
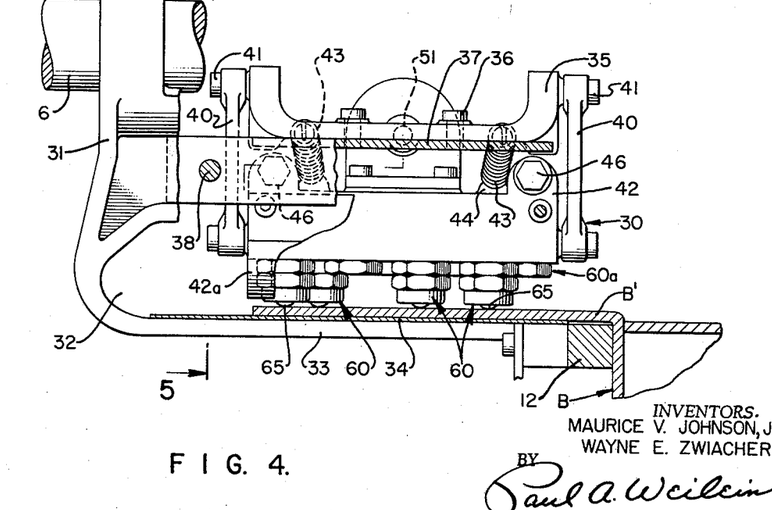
FIG. 4 is an enlarged fragmentary view illustrating one of the adhesive applicator assemblies of FIG. 3, with certain of the parts broken away.

Referring to FIGS. 1–3, the box flap manipulating apparatus of the machine is shown as including transversely spaced upright supports 2, 2 on which are mounted in vertically spaced relation an upper box flap manipulating assembly generally designated 3 and a lower box flap manipulating assembly generally designated 4. The upright supports 2 are vertically adjustable as by means of an adjustor screw 5 so that the box flap manipulating assemblies 3 and 4 may be vertically adjusted to accomodate boxes of different heights. In addition, it will be noted that the upper box flap manipulating assembly 3 is transversely adjustable on support rods 6 by means of a double thread crank screw 6a, while the lower box flap manipulating assembly 4 is similarly adjustable on support rods 7 by means of a double thread crank screw 7a.

Boxes with unglued flaps are adapted to be fed through the flap manipulating assemblies 3 and 4 by means of an endless chain and cross bar assembly comprising transversely spaced chains 9, 9 riding in guides 9a, 9a and interconnecting cross bars 10. These cross bars 10 will engage a box B as shown in FIG. 2 and cause movement of the later longitudinally along a box supporting plate or table 11. The apparatus is adapted to progressively cause the flaps of each box passing along the table 11 to be swung upwardly and outwardly and ultimately to a horizontally extended position both at the top and the bottom of the box.

Accordingly, the apparatus as shown in FIGS. 1 and 2 is provided with upper and lower guide rails 12 adapted to centralize the box in its travel longitudinally through the apparatus. In addition, the apparatus includes a pair of generally triangular flap openers 13, 13 in the upper box flap manipulating means, these openers 13 being pivotally mounted on horizontal pivots for a purpose which will hereinafter be described. The box flap openers 13 will assure the proper presentation of the flaps to flap guide wings 14, 14 at opposite sides of the apparatus which extend from adjacent the openers 13 whereat they have substantially vertical ends disposed adjacent the openers 13 to a position as shown at 14a whereat they are disposed substantially horizontally in overlying relation to a plate 15, the respective upper box flaps being thereby caused to move upwardly and outwardly and thence to a horizontal position as each box progresses through the apparatus.

Inasmuch as the lower box flaps would generally depend from the body of the box which is supported on the plate or table 11, the use of openers for the bottom flap may be eliminated, however, the lower box flap manipulating means 4 is provided with wings 16 adapted to engage the lower box flaps and move them downwardly and outwardly, and thence to a horizontally disposed position between portions 16a of the wing 16 and a subjacent plate 17 between which the lower box flaps will pass.

In the conventional apparatus thus far described, the box openers 13, as previously mentioned, are pivotally supported on a horizontal axis, these openers are suspended from a lever 20 by a chain 21, the lever being weighted as at 22 and being pivotally supported by a switch actuator for a switch 24. Accordingly, in the event that a box is improperly presented to the flap openers 13, the flap openers will be caused to swing upwardly, allowing the weighted lever 22 to rock the switch actuating shaft, thus to shut off the prime mover 1 as will hereinafter be more fully described, which drives the box feed chains 9.

Accordingly, it will now be recognized that as the box B shown in full lines in FIG. 2 moves progressively through the apparatus to the position shown in broken lines in FIG. 2 with the upper box flaps B′ disposed horizontally between plates 14a and 15 and with the lower box flaps disposed horizontally between plates 16a and 17, the flaps would respectively be presented to conventional adhesive applicator rollers 25, 25 in the upper box flap manipulating and adhesive applying assembly 3 and to adhesive applying rollers 26, 26 in the lower box flap manipulating and adhesive applying assembly 4 in the conventional machine as shown in the above identified patent. As the box flaps are moved past the rollers 25 and 26, the flaps are ultimately engaged by folding wings 27 in the upper assembly 3 and corresponding wings in the lower assembly 4 so that the flaps are again folded inwardly and are subsequently pressed into engagement with the inside box flaps so as to tightly unite the box flaps together. The present invention provides novel coating or adhesive applicator devices in lieu of rollers 25 and 26. Such novel applicator devices are generally designated 30 and are adapted to apply adhesive to the inside faces of the upper and lower box flaps. These applicators 30 may be advantageously applied to existing machines, as herein illustrated, at a location between the existing adhesive applicator rollers 25, 26 and the folding wings 27 just referred to.

Referring more particularly to FIGS. 3 through 7, it will be noted that each of the adhesive applicator assemblies 30 is preferably supported upon a bracket 31. As seen in FIG. 3, a pair of brackets 31 are supported upon the support rod 6 and a pair of lower brackets 31 are supported upon the support rod 7 so as to be adjusted laterally by the adjustor screws 6a and 7a, upon adjustment of the respective upper and lower box flap manipulating mechanisms. Each of the brackets 31 is horizontally slotted as at 32 and is provided with a support arm 33 in spaced relation to the main body of the bracket and a back-up plate 34 is disposed within the slot 32 of each bracket 31 and extends longitudinally of the machine in a plane with the respective plates of the horizontally and laterally spaced adjacent bracket 31. Each of the plates 34 provides a back-up against which a box flap is adapted to be pressed by the respective adhesive applicators 30.

Each applicator device includes a support 35 connected as by screws 36 or the like to an angle iron 37 or other appropriate supporting member which in turn is connected to the respective bracket 31 as by means of fasteners 38. At opposite ends of the support 35 of each of the applicator devices, there is pivotally mounted a pair of parallel links 40 which depend from the support 35 and are pivotally connected to the latter as at 41. At the opposite end from the pivotal connection 41 the links are pivotally connected to an applicator head 42 whereby this head is shiftable toward and away from its adjacent box flap backing plate 34. This parallel linkage arrangement permits the applicator head to float on the carton flap and accommodate itself to irregularities that may be encountered in applying adhesive to such flaps.

Figure 7:
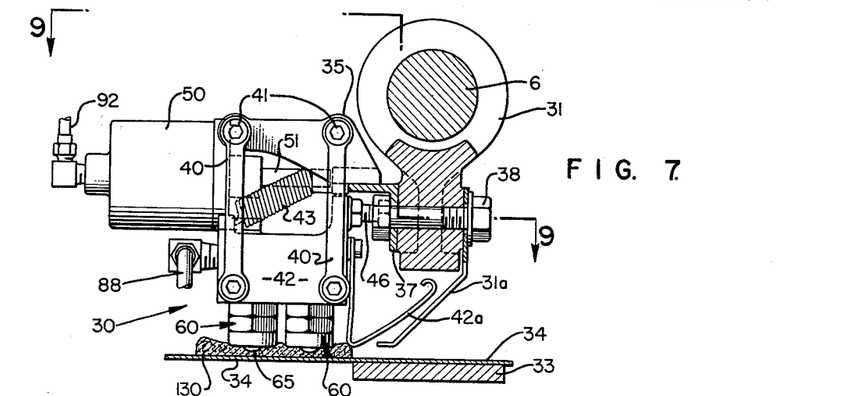
FIG. 7 is a view also corresponding to FIG. 5, but showing the applicator in its lowermost position of repose, with a sponge disposed therebeneath.

Suitable resilient means are provided for normally biasing the applicator head 42 toward its adjacent plate 34 and in the illustrative embodiment, a pair of coiled tension springs 43 are respectively connected at one end to upstanding ears 44 on the applicator head and at their other end, as at 45, the springs 43 are connected to the support 35. As shown in FIG. 7, movement of the applicator head 42 under the influence of the springs 43 is limited by means of a pair of abutment screws 46 threaded into supporting nuts or otherwise threadedly connected to the applicator head 42 and engageable with the opposed face of the angle iron 37 so as to provide adjustable stop means to limit movement of the applicator head 42.

Figure 5:
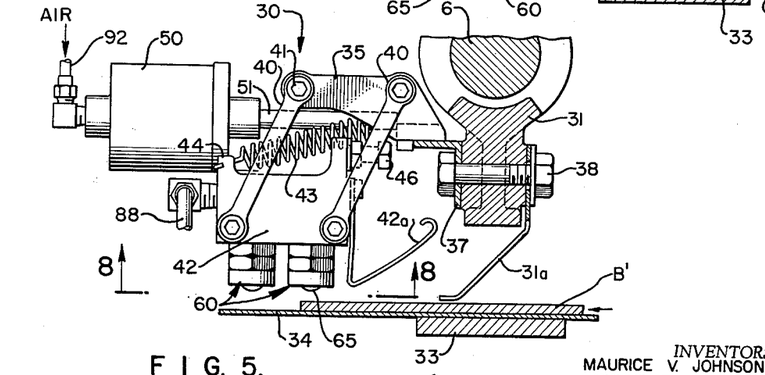
FIG. 5 is a view as taken on the line 5—5 of FIG. 4, showing the applicator in its first or uppermost position, with a box flap or the like approaching a position for the application of adhesive thereto.

Means are also provided for shifting each of the applicator heads 42 away from its plate 34 and against the tension of the springs 43. Such means in the illustrative embodiment comprises a fluid pressure operated actuator including a cylinder 50 from which extends one end of a piston 51 which as shown in FIG. 5 is abuttable with the bracket for a support 35 upon the application of fluid under pressure to the cylinder 50 to cause movement of the head 42 in an arcuate path to a position substantially spaced from the plate 34. The application of fluid under pressure to each of the cylinders 50 of the respective applicator heads 42 is controlled in a manner which will hereinafter be more fully described.

Figure 10:
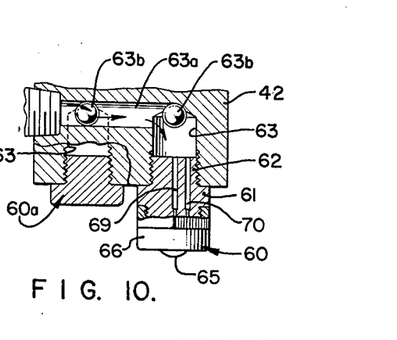
FIG. 10 is a fragmentary detail view in section, as taken on the line 10—10 of FIG. 8.
Figure 11:
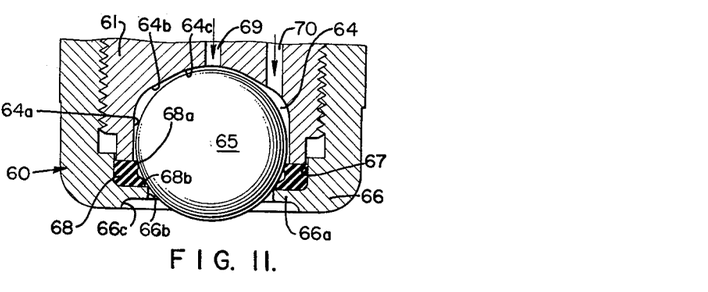
FIG. 11 is an enlarged fragmentary detail view in section illustrating the applicator head with the ball valve closed.

Adhesive applicators 60 are carried by the applicator head and constitute means for applying adhesive to a box flap as it passes between the applicators 60 and the plate 34 opposed to the latter. Each of the applicators 60, as best seen in FIGS. 10 through 11, consists of a ball retainer 61 having a threaded stem 62 engaged in a threaded bore 63 in the applicator head 42. In the outer end of the ball retainer 61 is a ball recess or chamber 64 of a form which will be hereinafter described in detail, but which is adapted to receive a ball 65. The ball 65 is retained in the recess 64 by a ball retainer cap 66 which is threaded to the ball retainer 61 and has a radially inwardly extended flange 66a which is provided with an annular seat 67 for the reception of a stepped sealing ring 68. This ring 68 is engaged in the seat 67 and with the outer extremity of the ball retainer 61 and provides stepped sealing portions 68a and 68b adapted to sealingly engage with the ball 65 when the ball is in the position shown in FIG. 11.

Figure 12:
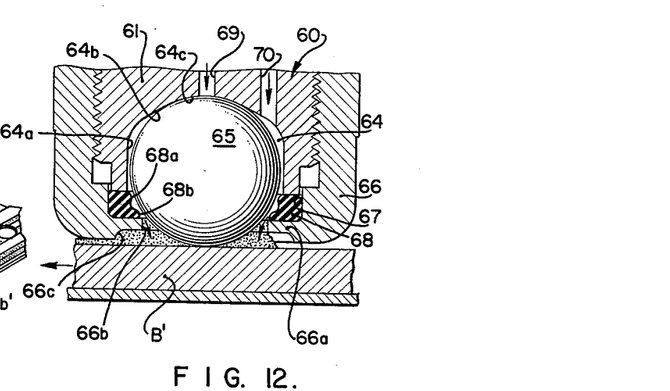
FIG. 12 is a view corresponding to FIG. 10, but illustrating the application of adhesive to the member to be coated.

The ball chamber 64 is formed by a generally cylindrical wall 64a in the ball retainer 61 which merges with a generally conical wall 64b which converges toward the inner extremity of the ball chamber and merges with a wall 64c of aspherical form against which the ball 65 abuts when it is in its innermost position as shown in FIG. 12. The threaded connection of the retainer cap 66 to retainer 61 provides means for adjusting the distance between the cap 66 and the aspherical wall 64c.

Extending through the ball retainer 61 is a pair of passageways which establish communication between the bore 63 in the applicator head 42 and the ball chamber 64. One of these passageways is designated 69 and extends coaxially with the ball retainer 61 while the other of the passages is designated 70 and leads into the annular region of the ball chamber defined at the juncture of the cylindrical wall 64a and the conical wall 64b of the ball chamber.

It will now be noted that the applicator 60 is so constructed that adhesive supplied to the bore 63 in the applicator head 42 will be fed to the ball chamber 64 through the passages 69 and 70 and upon the balls being unseated from the sealing ring 68 as shown in FIG. 12 by a box flap B', adhesive is free to flow past the ball through a central opening 66b in the flange 66a of the retainer cap 66.

In order to assure rapid and positive seating of the ball 65, without spring loading the ball, the diameter of the opening formed by cylindrical wall 64a is only slightly larger than the diameter of the ball, and since this cylindrical wall conforms in shape to the ball in a diametrical plane normal to the axis of the cylindrical wall, a relatively high differential fluid pressure exists on opposite sides of the ball upon admission of fluent material to the chamber. Because of this, the ball is rapidly and firmly seated when upward pressure thereon by the carton flap is removed. Passage 69 also contributes to the rapid action of the ball since it assures fluid pressure behind the ball and prevents the development of a vacuum which would make its operation erratic. This passage also assures a supply of adhesive to the aspherical wall 64c to provide lubrication for the ball as it rotates in contact therewith.

Rapid closing is also due to relatively short travel of the ball from its unseated to seated position. It is only necessary to lift the ball enough to unseat it to the extent that sufficient adhesive will flow between the ball and seat. The seat contacts the ball in a horizontal plane approximately ¼ the diameter of the ball measured upwardly from the surface of the ball contacting the carton. The dimensions of the ball retainer cap 66 and the depth of recess or chamber 64 are such that when the ball is lifted off its seat into contact with the aspherical wall 64c the clearance between the retainer cap and the surface to which the adhesive is being applied is equal to the thickness of the film of adhesive to be deposited on the surface, i.e., when closed the ball projects beyond the retainer cap surface which will oppose the box flap a distance greater than the distance between the end wall 64c and the opposed surface of the ball.

In practice, we have found that an applicator made according to the principles disclosed herein for applying commercial adhesives to carton flaps of the type used in the citrus industry should advantageously be so dimensioned as to deposit a film of glue having a thickness of from .002 to .005 inch in order to enable rapid adhesion of the box flap. A typical applicator for this purpose may employ a ball 65 having a diameter of .375" operating in a recess 64 having a diameter of .378" to .382". The overall lift required to lift the ball off its seat and into contact with surface 64c would be in the order of ¹⁄₃₂". It will be understood that the foregoing dimensions may be varied somewhat depending on the viscosity of the fluid, the thickness of the film desired and the nature of the surface to which it is applied.

It will be seen therefore that the ball is used not only as a valve to control the flow of adhesive as close to the point of application as possible, but in addition, functions as a gauge to limit the downward movement of the applicator so that the desired clearance between the cap 66 and the carton flap is maintained. Since this clearance determines the thickness of the adhesive film applied, the applicator will function to apply a uniform film of adhesive each and every time it is in contact with and moved over a surface.

While we have found that the step sealing ring shown in FIGS. 11 and 12 is desirable in that it contributes materially to the dripless functioning of the applicator, sealing rings having other cross sectional shapes, such as circular, could be used, or the ball could seat directly on the outlet opening in the cap. We have found, however, that without a sealing ring it is difficult to provide the close tolerances that are essential if dripless operation is desired.

The applicator head 42 is provided with a passageway 63a which is in communication with a plurality of longitudinally extended passageways 63b, the latter passageways being in communication with each of the bores 63 in the head 42 so that a source of adhesive under pressure connected to the passageway 63a will supply adhesive to each of the applicators 60.

In order to enhance the uniform application of adhesive to the box flap B', the outer face of the retainer cap 66 in the region of the flange 66a is preferably recessed as at 66c to provide a reservoir of adhesive to be applied to the box flap B' as the latter moves beneath the applicator.

Figure 8:
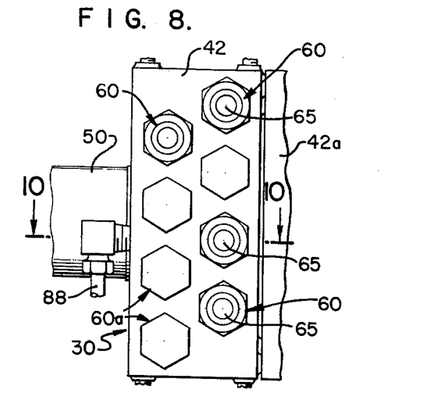
FIG. 8 is a view as taken on the line 8—8 of FIG. 5 with a portion of the box flap supporting plate broken away.
Figure 9:
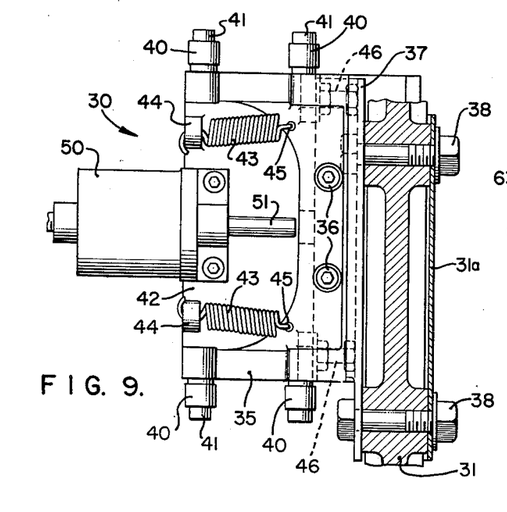
FIG. 9 is a view in section through the applicator assembly as taken on the line 9—9 of FIG. 7.

Furthermore, as shown in FIGS. 8 and 9, applicators 60 may be arranged in a selected pattern in the applicator head 42, and to this end the applicator head 42 is provided with a plurality of rows of threaded bores 63 as referred to above into which may be inserted either an applicator 60 or a blank plug 60a in any desired pattern.

In addition, as best seen in FIG. 8, the zone of adhesive application of each applicator extends to or slightly overlaps the zone of application of an adjacent applicator. This is to say that, for example, the two uppermost applicators 60 shown in FIG. 8 have reservoirs 66c formed therein and the applicators 60 are so spaced relative to one another that the reservoir 66c of the uppermost applicator 60 extends at least up to a point coincident with the extent of the radial projection of the reservoir 66c of the applicator 60 which is next to the uppermost applicator 60 in FIG. 8.

Figure 13:
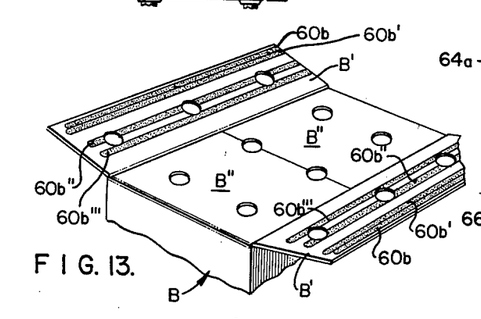
FIG. 13 is a fragmentary detail view in perspective showing a box having its upper flaps coated by the apparatus of the invention and prior to closing of the flaps.

In FIG. 8 it will be noted that the applicators 60 are arranged in a pattern in relation to blank plugs 60a so as to provide on the box flap B', as shown in FIG. 13, adhesive strips 60b, 60b', 60b'' and 60b''', with adhesive strips 60b and 60b' disposed immediately adjacent one another and with adhesive strips 60b'' and 60b''' substantially spaced apart. As a result of this novel arrangement of applicators and the ability to apply adhesive material to the box flap B' in discrete areas separated by areas to which adhesive material has not been applied, it has been found that the adhesive material more effectively and rapidly securely bonds the closed flaps to the inside flaps B'' as shown in FIG. 12 due to the rapid absorption of solvent from the adhesive material into the uncoated box flap areas and due to the thin uniform layer of adhesive which is deposited by the applicator.

Figure 14:
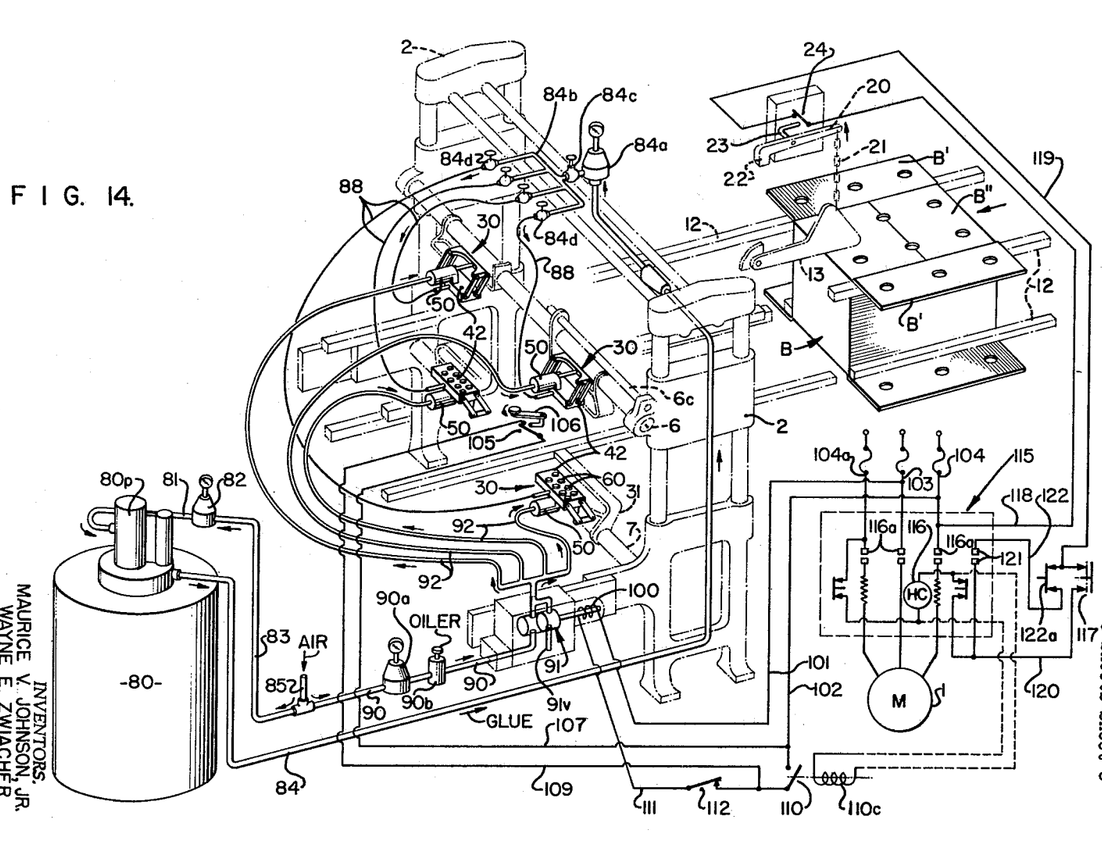
FIG. 14 is a diagrammatic view in perspective illustrating the adhesive applicator devices of the invention, the actuating and control systems therefor, as well as the adhesive pressure feed system therefor.

Referring now to FIG. 14, there is illustrated diagrammatically an adhesive applying system whereby adhesive is supplied under pressure to the respective applicators 60 of each of the applicator heads 42. This adhesive supplying system includes an adhesive reservoir 80 to which is connected a pump 80p. The pump 80p is preferably air operated by air supplied through a line 81 through a pressure regulator 82 and a line 83. A line 84 leads from the pump, and connected to the line 84 are lines 88 which are each adapted to carry adhesive under pressure to the respective adhesive applicator heads 42 so as to maintain a constant supply of adhesive under pressure at each of the applicator heads 60. Preferably, suitable valving is interposed between the adhesive supply line 84 and branch lines 88. In the illustrative embodiment, line 84 leads to a regulator 84a. A manifold 84b is connected to the regulator 84a, and a shut-off valve 84c is interposed between the manifold and the regulator. Between the manifold and each branch line 88 is a throttle or needle valve 84d.

Figure 6:
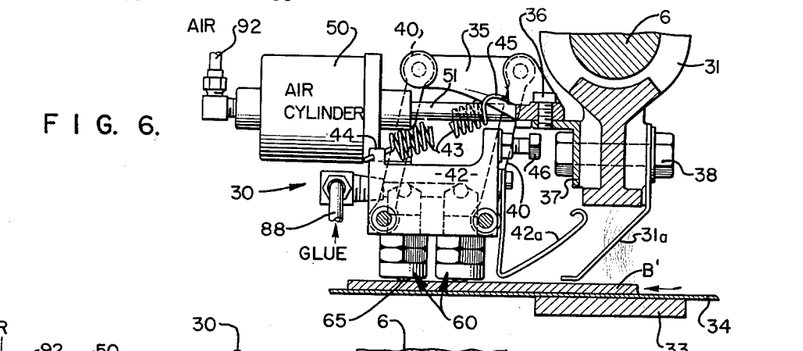
FIG. 6 is a view corresponding to FIG. 5, but showing the applicator in its second or adhesive applying position, in engagement with the flap.

From the air line 85 a branch line 90 leads through a solenoid operated normally closed valve 91 to a plurality of air lines 92 which respectively lead to a fluid pressure actuator cylinder 50 of each of adhesive applicator assemblies 30, so that with the valve in a normally closed position, it will vent the lines 92 to atmosphere through a vent 91v and allow the tension springs 43 to swing the applicator heads 42 downwardly towards the respective plates 34 for engagement with a box flap B' as shown in FIG. 6. Preferably, a regulator 90a is interposed in line 90, and in addition, an oil dispenser 90b is interposed in line 90 between the source of air and the valve 91.

Means are provided for controlling the valve 91 so that air or other fluid is normally applied to the actuator cylinders 50 so as to hold the applicator heads 42 in the uppermost positions as shown in FIGS. 5 and 14 when the machine is in operation. As previously mentioned, the valve 91 is preferably normally closed so as to prevent the passage of air from line 90 into the several lines 92 leading to the cylinders 50. This valve is preferably solenoid operated and includes a coil 100 which when energized will hold the valve in the open position as shown in FIG. 14, and close off the vent 91v. The solenoid 100 is in circuit with a pair of conductors 101 and 102 which are connected with leads 103 and 104, respectively, of an electric motor or prime mover M which is also adapted to drive the box feed chains 9 previously referred to.

The solenoid 100 is under the control of switch means including a microswitch 105 which, as best seen in FIGS. 2 and 3, as well as in FIG. 14, has an actuator arm 106 disposed for engagement by a box B as the latter approaches a position whereat it is desired to apply adhesive to the open flaps thereof. Microswitch 105 is connected in the circuit with solenoid 100 by means of a line 107 which is connected to line 102 leading from lead 104 and by a line 109 which is connected with a switch 110. This switch 110 and the line 109 are connected to the solenoid 100 by a line 111 in which is interposed a switch 112 which, when open, breaks the circuit to the solenoid independently of the condition of microswitch 105 or parallel switch 110. However, it will be noted that so long as switch 112 is closed, the solenoid 100 will be energized upon closure of either of the microswitch 105 or the parallel switch 110. Microswitch 105 is preferably normally closed and so also is the parallel switch 110. It will be noted, however, that the switch 110 is adapted to be opened by a coil 110c when the motor M is energized.

Preferably, the motor M is of the 220 volt triple phase type and hence a third conductor 104a leads to the motor M and the motor is under the control of a magnetic starter switch generally designated 115 having relay contacts 116a in the respective conductors 103, 104 and 104a leading to the motor M. A holding coil 116 is adapted to be energized by a push button switch 117 which is normally open and which is in series with the aforementioned lever actuated switch 24. In this connection, a conductor 118 leads from motor lead 104 to the switch 24 and a conductor 119 leads from the switch 24 to the push button switch 117 which is normally open. Leading from the switch 117 to the holding coil 116 is a conductor 120. Momentary closure of push button switch 117 will energize coil 116 to close contacts 116a, thus energizing the motor M and at the same time closing contacts 121 in a line 122, thereby shunting the push button switch 117 so as to maintain energization of the holding coil 116.

It will now be apparent that with the solenoid 100 of solenoid valve 91 energized, air will be admitted to the actuator cylinders 50 to retain the applicator heads 42 in their uppermost position. The solenoid 100 will remain energized upon closure of the motor starting switch 115 so long as the microswitch 105 is closed. However, as a box B is progressed through the apparatus and engages the actuator arm 106 of the microswitch 105, the latter will be opened, thus de-energizing the solenoid 100 and allowing the valve 91 to close whereby the actuators 50 are vented through the vent 91v.

The microswitch 105 is preferably located at a position such that the solenoid 100 will be de-energized when the box flaps have reached a position just beneath the applicator heads 42 of the respective adhesive applicators 30, whereupon the applicator heads will move from a retracted non-adhesive applying or first position to a second position as shown in FIG. 6, whereat the applicators 60, and more particularly the applicator balls 65, are in engagement with the contiguous face of the flap B' so as to apply adhesive thereto as illustrated in FIG. 12.

In the event that a box flap may be improperly disposed with relation to the applicator heads as the flap progresses toward the latter, that is, in the event that the flap may be somewhat curled or slightly angularly disposed, the respective applicators are each preferably provided with a fixed flap guide 31a connected to the supporting bracket 31 and a traveling generally V-shaped flap guide 42a carried by the respective applicator head. Thus, the fixed flap guide 31a will tend to properly dispose the leading edge of a flap for engagement by the applicators 60 as the applicator head moves into a flap engaging or second position and the traveling flap guide 42a will implement the corrective action of the stationary flap guide 31a.

As the box B passes on beyond the microswitch 105, it will again close, thus energizing solenoid 100 and reopening valve 91 to allow air to flow to actuator cylinders 50 to return the applicator heads 42 to the elevated or first non-adhesive applying position.

Independently of the condition of the circuit for controlling the solenoid valve 100, should a box B be improperly presented to the flap openers 13 so as to cause upward movement thereof, the weighted lever actuated switch 24 will be opened, thus breaking the circuit to the motor M and preventing further advancement of the boxes. In the event that a box B should be in engagement with the microswitch actuator arm 106 so that microswitch 105 is open when the motor is de-energized, as just referred to, de-energization of the motor will cause the relay 110c to be de-energized, whereby switch 110 will be closed. Since switch 110 is in parallel with microswitch 105, the solenoid 100 will be energized even though microswitch 105 be open, so that the applicator heads will be elevated, thus preventing the continued flow of adhesive while the movement of boxes through the apparatus is halted.

When it is desired to shut the apparatus down at the close of a run of boxes therethrough, the motor M is de-energized by breaking the shunt circuit 122 by a switch 122a disposed therein, and such de-energization of the motor will, as mentioned above, cause closure of switch 110 so that the solenoid 100 will again be energized to open the valve 91 so that the applicator heads will be retained in an uppermost position.

Preferably, at this time, a sponge or other moisture absorbent material generally designated 130 in FIG. 7, may be disposed between the respective applicator heads and the opposing backing plate 34 and subsequently switch 112 in the circuit of solenoid 100 may be opened to de-energize the solenoid 100, thereby venting the actuator cylinders and allowing the applicator heads 42 to be moved to the position shown in FIG. 7 with the applicators 60 in engagement with the sponge or other moisture absorbent material 130, which is preferably moisture soaked to prevent drying of residual adhesive on the box flap engaging portions of the applicators 60. When it is desired to again operate the apparatus it is only necessary to close switch 112 and press push button 117 and operation may be resumed.

From the foregoing it will be apparent that the present invention not only provides means for applying adhesive or other fluent material to a surface to be coated in a very efficient and positive manner over selected areas of different patterns as may be required or desired, but also the invention provides a system for controlling the application of adhesive or other fluent material to such a surface to be coated, wherein the system is controlled in an effective manner for the purpose of conserving fluent adhesive or other material and otherwise manipulating the applicator devices responsive to the location or condition of the member to be coated as it is progressed through the apparatus. Such progression is controlled by the system in the event of an improperly presented member to be coated and the progression of the member to be coated controls the application of fluent materials thereto.

Moreover, while the specific details of the preferred embodiment of the invention has been herein shown and described, changes and alterations may be resorted to without departing from the spirit of the invention as defined in the appended claims.

We claim:

1. In a system for applying fluent material to a member to be coated: means for moving said member along a path; an applicator head disposed in said path and movable from a first non-coating position to a second position for applying fluent material to said member; means for moving said applicator head between said positions; and control means actuated by said member for causing said applicator head to be moved from said first position to said second position and from said second position to said first position upon movement of said member into a position to be coated and past said position respectively.

2. A system as defined in claim 1, wherein said means for moving said applicator head includes a fluid pressure operated actuator.

3. A system as defined in claim 1, wherein said means for moving said applicator head includes a fluid pressure operated actuator; and said control means includes a normally closed valve interposed between said actuator and a source of fluid under pressure.

4. In a system for applying fluent material to a member to be coated: means for moving said member along a path; an applicator head disposed in said path and movable from a first non-coating position to a second position for applying fluent material to said member; fluid pressure opreated means for maintaining said applicator head in said first position; a normally closed electrically opened valve interposed between said fluid pressure operated means and a source of fluid under pressure; control means including an electrical circuit for causing said valve to be opened, and means for moving said applicator head to said second position when said valve is closed.

5. A system as defined in claim 4, wherein said control means comprises means in said electrical circuit disposed in the path of movement of said member and engageable thereby to cause said valve to be closed.

6. A system as defined in claim 4, wherein said circuit is energized to hold said valve open, and including a switch for closing said circuit when operation of the means for moving said member is interrupted.

7. A system as defined in claim 4, wherein said control means comprises a pair of switches in parallel for causing said circuit to be energized when either of said switches is closed; one of said pair of switches being closed when operation of said means for moving said member is interrupted, and the other of said switches being normally closed and having means disposed in the path of said member and actuatable thereby to open said other switch.

8. In a system for applying fluent material to a member to be coated: means for moving said member along a path; an applicator head disposed in said path and movable from a first non-coating position to a second position for applying material to said member; fluid pressure operated means for moving said head and holding said head in said first position; means for supplying fluid under pressure to said fluid pressure operated means; a solenoid valve for controlling the flow of fluid to said fluid pressure operated means; an electric motor for driving the means for moving said member; a starter for said motor including a switch in circuit with said solenoid valve and means for actuating said switch upon starting of said motor; a second switch in the path of said member and in circuit with said solenoid valve in parallel to the first mentioned circuit for controlling said solenoid valve when said member engages said second switch; and means for moving said head to said second position upon engagement of said member with said second switch.

9. Apparatus for applying adhesive to box flaps, comprising: means for shiftably supporting a box having a flap; means for shifting the box on said supporting means; means for positioning the box flap for the application of adhesive as the box is shifted on said supporting means past a location at which the box flap is positioned as aforesaid; means for applying adhesive to the box flap; said adhesive applying means including an applicator head; means for supplying adhesive under pressure to said applicator head; means for shiftably supporting the applicator head for movement between a first position out of the path of the box flap and a flap engaging second position upon movement of said box on said supporting means to and past said location; said applicator head including a plurality of applicators spaced in planar relation; and said supporting means for said applicator head including parallel linkage means.

10. Apparatus for applying adhesive to box flaps, comprising: means for shiftably supporting a box having a flap; means for shifting the box on said supporting means; means for positioning the box flap for the application of adhesive as the box is shifted on said supporting means past a location at which the box flap is positioned as aforesaid; means for applying adhesive to the box flap; said adhesive applying means including an applicator head; means for supplying adhesive under pressure to said applicator head; means for shiftably supporting the applicator head for movement between a first position out of the path of the box flap and a flap engaging second position upon movement of said box on said supporting means to and past said location; said applicator head including check valve means for shutting off the flow of adhesive and engageable with the box flap when said applicator head is in said second position to permit the flow of fluid.

11. Apparatus for applying adhesive to box flaps, comprising: means for shiftably supporting a box having a flap; means for shifting the box on said supporting means; means for positioning the box flap for the application of adhesive as the box is shifted on said supporting means past a location at which the box flap is positioned as aforesaid; means for applying adhesive to the box flap; said adhesive applying means including an applicator head; means for supplying adhesive under pressure to said applicator head; means for shiftably supporting the applicator head for movement between a first position out of the path of the box flap and a flap engaging second position upon movement of said box on said supporting means to and past said location; said applicator head including check valve means for shutting off the flow of adhesive and engageable with the box flap when said applicator head is in said second position to permit the flow of fluid; said check valve means comprising a revolvable element engageable with the box flap.

12. Apparatus for applying adhesive to box flaps, comprising: means for shiftably supporting a box having a flap; means for shifting the box on said supporting means; means for positioning the box flap for the application of adhesive as the box is shifted on said supporting means past a location at which the box flap is positioned as aforesaid; means for applying adhesive to the box flap; said adhesive applying means including an applicator head; means for supplying adhesive under pressure to said applicator head; means for shiftably supporting the applicator head for movement between a first position out of the path of the box flap and a flap engaging second position upon movement of said box on said supporting means to and past said location; said applicator head including check valve means for shutting off the flow of adhesive and engageable with the box flap when said applicator head is in said second position to permit the flow of fluid; said check valve means comprising a revolvable element engageable with the box flap; and retainer means for said element; said retainer means having a face which opposes said flap; said face having therein a recess extending about said revolvable element and forming an adhesive reservoir.

13. Apparatus for applying adhesive to box flaps, comprising: means for shiftably supporting a box having a flap; means for shifting the box on said supporting means; means for positioning the box flap for the application of adhesive as the box is shifted on said supporting means past a location at which the box flap is positioned as aforesaid; means for applying adhesive to the box flap; said adhesive applying means including an applicator head; means for supplying adhesive under pressure to said applicator head; means for shiftably supporting the applicator head for movement between a first position out of the path of the box flap and a flap engaging second position upon movement of said box on said supporting means to and past said location; said applicator head including check valve means for shutting off the flow of adhesive and engageable with the box flap when said applicator head is in said second position to permit the flow of fluid; said check valve means comprising a revolvable element engageable with the box flap; and retainer means for said revolvable element having a chamber in which said revolvable element is shiftably disposed; said retainer means having a surface in said chamber for limiting movement of said revolvable element into said chamber.

14. An applicator for applying a coating of fluent material to a surface, comprising: a revolvable applicator element; retainer means having a chamber in which said element is movably disposed; an inner wall in said chamber engageable by said element to limit movement of the latter inwardly in said chamber; sealing means circumscribing said chamber and engageable by said element upon movement of the latter outwardly in said chamber; and a plurality of fluent material inlets leading into said chamber; one of said inlets extending through said wall.

15. An applicator as defined in claim 14, wherein said element is spherical.

16. An applicator as defined in claim 14, wherein said element is spherical; and said retainer means has a frusto-conical wall forming the inner end of said chamber providing a space into which another of said inlets extends.

17. An applicator for applying a coating of fluent material to a surface, comprising: a revolvable applicator element; retainer means having a chamber in which said element is movably disposed; an inner wall in said chamber engageable by said element to limit movement of the latter inwardly in said chamber; sealing means circumscribing said chamber and engageable by said element upon movement of the latter outwardly in said chamber; a fluent material inlet leading into said chamber; said sealing means comprising a resilient member; said member having a pair of sealing shoulders spaced laterally and axially of one another; and said element having an arcuate surface engageable with said sealing shoulders.

18. An applicator for applying a coating of fluent material to a surface, comprising: a revolvable applicator element; retainer means having a chamber in which said element is disposed; an inner wall in said chamber engageable by said element to limit movement of the latter inwardly in said chamber; sealing means circumscribing said chamber and engageable by said element upon movement of the latter outwardly in said chamber; said retainer means having a face provided with an opening through which said element projects; and a recess in said face providing a fluent material reservoir; said face providing a rim for spreading fluent material from said reservoir in a layer of uniform thickness.

19. An applicator for applying a coating of fluent material to a surface, comprising: a member having a chamber therein defined by an end wall and an elongated side wall; a revolvable applicator element shiftably disposed in said chamber; means for retaining said applicator element in said chamber and providing a seal when engaged by said applicator element; a fluent material inlet communicating with said chamber; said applicator element being interposed between said inlet and said retaining means; and said side wall of said chamber conforming to the shape of said applicator element and being only slightly larger than the latter, whereby fluent material supplied to said chamber under pressure creates a substantial differential pressure across said applicator element to force said applicator into engagement with said retaining means.

20. An applicator as defined in claim 10, wherein said side wall is cylindrical and said applicator element is spherical.

21. An applicator as defined in claim 19, wherein said side wall is cylindrical; said end wall being aspherical; said applicator element being spherical; and said inlet entering said chamber adjacent the juncture of said side and end walls.

22. An applicator as defined in claim 19, wherein said side wall is cylindrical; said end wall being aspherical; said applicator element being spherical; and said inlet entering said chamber axially of said chamber through said aspherical end wall.

23. An applicator for applying a coating of fluent material to a surface, comprising: a member having a chamber therein defined by an end wall and an elongated side wall; a revolvable applicator element shiftably disposed in said chamber; means for retaining said applicator element in said chamber and providing a seal when engaged by said applicator element; a fluent material inlet communicating with said chamber; said retaining means having an outer face for spreading said fluent material upon said surface; and an opening through which said applicator element extends for engagement with said surface; the applicator element extending through said opening a distance greater than the distance between said applicator element and said end wall when said applicator element is engaged with said retaining means, whereby said applicator element will engage said end wall and limit movement of said face of said retaining means toward said surface.

24. An applicator as defined in claim 23, wherein means are provided for adjusting said retaining means relative to said end wall.

25. An applicator head for coating a member with fluent material, comprising: a body having an inlet for fluent material under pressure; a passage in said member communicating with said inlet; a plurality of outlets leading from said passage; a plurality of applicators in said outlets having means for applying fluent material to said member in a band of predetermined width; and adjacent applicators having the last-mentioned means of such a width as to apply contiguous bands.

26. An applicator for applying a coating of fluent material to a surface, comprising: a member having a chamber therein defined by an end wall and an elongated side wall; an applicator element shiftably disposed in said chamber; means for retaining said applicator element in said chamber and providing a seal when engaged by said applicator element; a fluent material inlet communicating with said chamber; said applicator element being interposed between said inlet and said retaining means; and said side wall of said chamber conforming to the shape of said applicator element and being only slightly larger than the latter, whereby fluent material supplied to said chamber under pressure creates a substantial differential pressure across said applicator element to force said applicator into engagement with said retaining means.

27. Apparatus for applying adhesive to box flaps, comprising: means for shiftably supporting a box having a flap; means for shifting the box on said supporting means; means for positioning the box flap for the application of adhesive as the box is shifted on said supporting means past a location at which the box flap is positioned as aforesaid; means for applying adhesive to the box flap; said adhesive applying means including an applicator head; means for supplying adhesive under pressure to said applicator head; said applicator head including check valve means for shutting off the flow of adhesive responsive to pressure from said adhesive supplying means and engageable with the box flap to be opened and permit the flow of adhesive therepast.

28. Apparatus for applying adhesive to box flaps, comprising: means for shiftably supporting a box having a flap; means for shifting the box on said supporting means; means for positioning the box flap for the application of adhesive as the box is shifted on said supporting means past a location at which the box flap is positioned as aforesaid; means for applying adhesive to the box flap; said adhesive applying means including an applicator head; means for supplying adhesive under pressure to said applicator head; a number of applicator elements carried by said head and having an opening for the passage of adhesive, and check valve means in said applicator elements engageable with said box flap to permit such adhesive flow and closeable when disengaged from said box flap to shut off said adhesive flow.

References Cited in the file of this patent

UNITED STATES PATENTS

| | | |
|---|---|---|
| 1,184,798 | Ward | May 30, 1916 |
| 1,647,072 | Berstein | Oct. 25, 1927 |
| 2,095,258 | Kimball et al. | Oct. 12, 1937 |
| 2,437,198 | Kay | Mar. 2, 1948 |
| 2,776,224 | Cote | Jan. 1, 1957 |
| 2,811,943 | Ferguson et al. | Nov. 5, 1957 |
| 3,056,337 | Bahr et al. | Oct. 2, 1962 |

UNITED STATES PATENT OFFICE
CERTIFICATE OF CORRECTION

Patent No. 3,135,628                                June 2, 1964

Maurice V. Johnson, Jr., et al.

It is hereby certified that error appears in the above numbered patent requiring correction and that the said Letters Patent should read as corrected below.

Column 13, line 19, for the claim reference numeral "10" read -- 19 --.

Signed and sealed this 29th day of September 1964.

(SEAL)
Attest:

ERNEST W. SWIDER                          EDWARD J. BRENNER
Attesting Officer                              Commissioner of Patents